(12) United States Patent
McDonald

(10) Patent No.: US 8,173,236 B1
(45) Date of Patent: May 8, 2012

(54) BAMBOO LOAD BEARING PANEL AND METHOD OF MANUFACTURING

(75) Inventor: William D McDonald, Santa Rosa, CA (US)

(73) Assignee: Bamcore LLC, Santa Rosa, CA (US)

( * ) Notice: Subject to any disclaimer, the term of this patent is extended or adjusted under 35 U.S.C. 154(b) by 692 days.

(21) Appl. No.: 12/113,943

(22) Filed: May 1, 2008

Related U.S. Application Data

(60) Provisional application No. 60/915,652, filed on May 2, 2007.

(51) Int. Cl.
*B32B 5/12* (2006.01)
*B32B 37/10* (2006.01)
(52) U.S. Cl. .......... 428/55; 428/47; 428/50; 428/54
(58) Field of Classification Search .......... 428/55, 428/54, 47, 50
See application file for complete search history.

(56) References Cited

U.S. PATENT DOCUMENTS 4,810,551 A * 3/1989 Chu .............................. 428/106

* cited by examiner

*Primary Examiner* — Brent Ohern
(74) *Attorney, Agent, or Firm* — Gary Hoenig

(57) ABSTRACT

A bamboo load bearing panel includes at least one bamboo panel element. The bamboo panel element includes a bamboo laminate layer with first and second layers of a plurality of bamboo strips having a cortex and pith surface, parallel and longitudinally cut from bamboo culm pressed flat and planed wherein the first and second layers are each planed to a thickness. The cortex surface of the first layer of bamboo strip is bonded to the cortex surface of the second layer of bamboo strip and a wood veneer layer is bonded to the pith surface of the first layer of the bamboo strip positioned such that the grain of the wood veneer layer is perpendicular to the grain of the bamboo strip. A finished bamboo load bearing panel includes at least one bamboo panel element bonded to optional layers of finishing wood veneers.

20 Claims, 3 Drawing Sheets

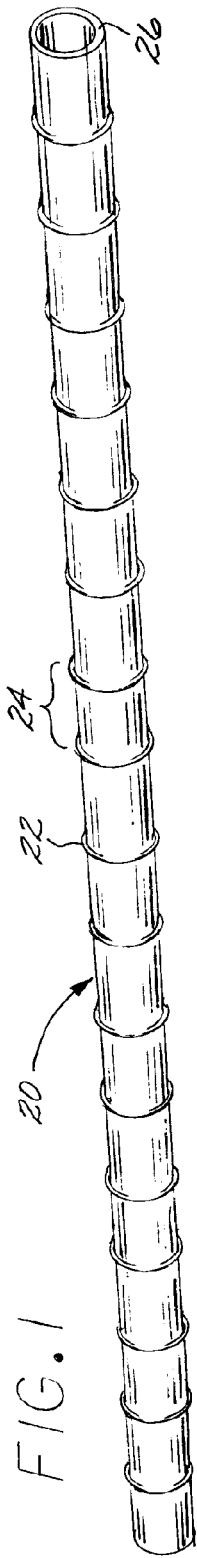
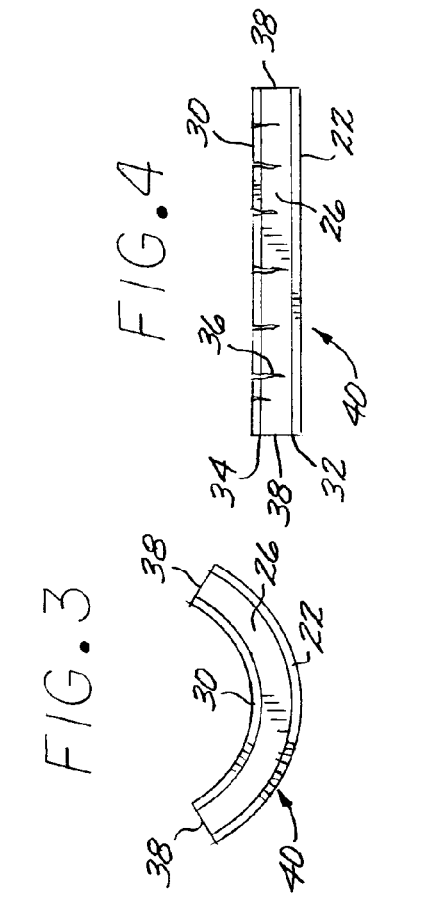

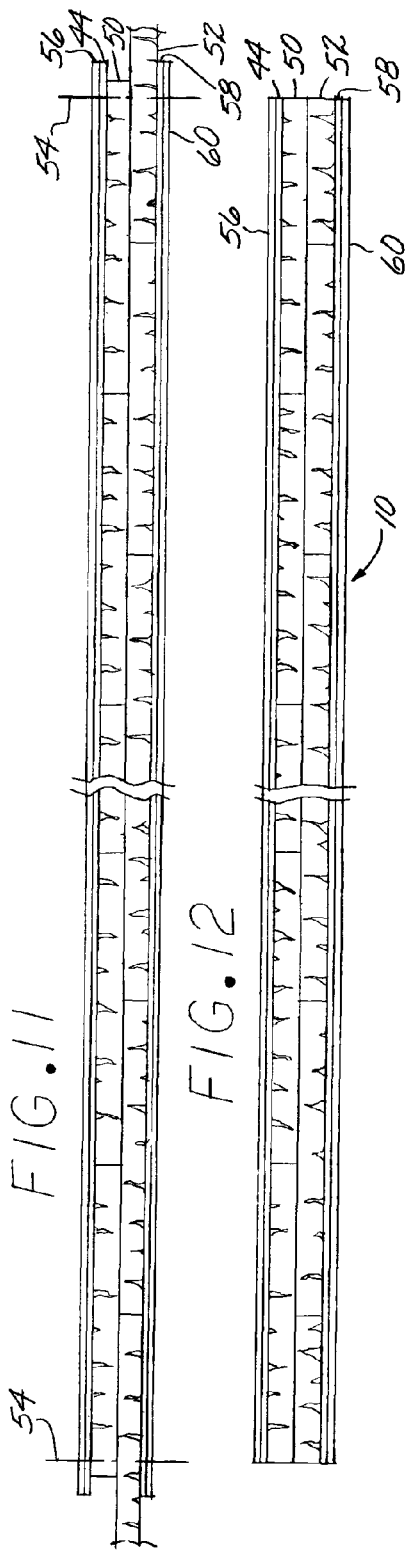
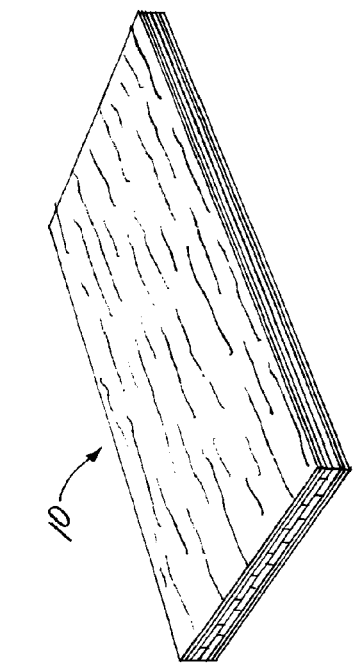
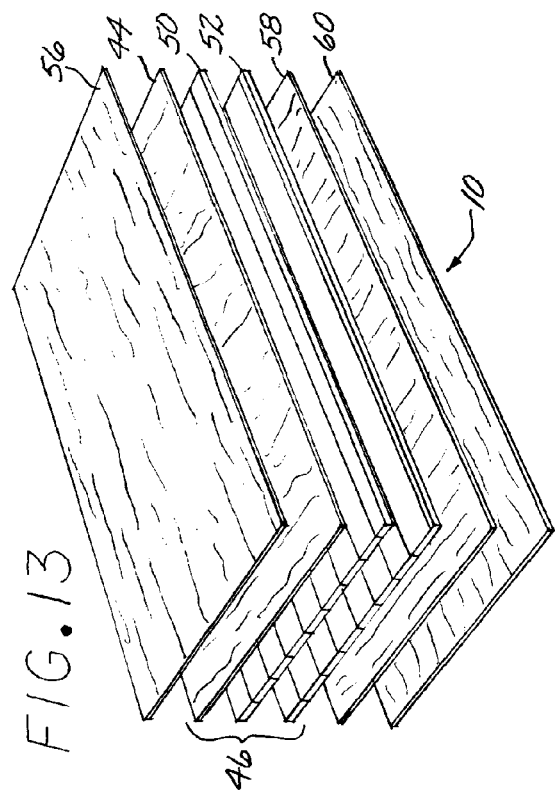

BAMBOO LOAD BEARING PANEL AND METHOD OF MANUFACTURING

FIELD OF THE INVENTION

The invention relates to the production of construction materials and, more particularly to a load bearing panel comprising bamboo as an element.

BACKGROUND OF THE INVENTION

Bamboo is a prolific woody grass that has long been used in various forms as a construction material. Bamboo possesses numerous properties advantageous to the construction industry. Of particular utility is the high vertical compression strength when used in pole form, also referred to as bamboo cane, as a vertical support member or load bearing element in a structure.

Traditional western construction practices utilize materials having well defined standardized dimensions, durability and strength characteristics. Consequently the use of bamboo cane, in its natural form as a replacement for traditional lumber, has been limited by inconsistency of cane sizes and structural variations requiring parsing and selection for diameter, length and wall thickness to satisfy structural specifications for each application. Additionally, the inconsistent shapes and dimensions of bamboo cane are difficult and costly to incorporate in the construction of most traditional buildings. Consequently, other methods of using bamboo present in the prior art are principally directed towards utilizing bamboo to replace wood in composite materials such as plywood, panels, or boards wherein the bamboo is shredded, cut into strips, wafers, or chips typically having the size and shape of the equivalent wood material. The portion of the bamboo that most closely mimics the equivalent wood material is the cellulose fibers and vascular components present in the outer portions of the bamboo culm where the density of the fibers and vascular components are high relative to a surrounding lignin natural polymer binder. Typically, the outer third portion of the culm is harvested, discarding the remainder, and shredded or crushed into wafers, chips, strands, flakes or other small shapes that are, in turn, bound together with resins and formed into board such as oriented strand board (OSB). These processes permit manufacturing finished construction materials utilizing bamboo and having consistent and predictable dimensions and structural characteristics. Composite products formed in this matter necessarily break the lignin natural bonding material and then are re-bonded with resin consequently losing a significant portion of the structural characteristics of a bamboo cane. In particular, breaking the natural lignin polymer bonds and re-bonding with resin significantly adds to the weight and cost of the finished material as compared to the weight and cost of the equivalent volume of raw bamboo. Further, the natural high vertical compression strength structure of the bamboo cane is lost.

Utilizing bamboo as a replacement for wood in load bearing construction materials has been problematic. However, bamboo has many advantages over wood as a raw material. Bamboo is generally lower cost than wood. Bamboo is fast growing requiring only 3 to 4 years before harvesting as timber grade bamboo, a growth time significantly less than wood. As compared to wood, bamboo has a higher rot resistance and resistance to insect infestation than most woods. Further, bamboo has a higher level of carbon sequestration than most woods. Therefore, what is needed is an improved load bearing construction material principally utilizing bamboo while maintaining the bamboo culm structure largely in tact thereby capitalizing on the advantageous characteristics of bamboo timber while providing a material with substantially consistent and predictable dimensions and structural characteristics such as timber or other load bearing structural components.

SUMMARY OF THE INVENTION

Accordingly, the present invention is directed to an improved load bearing construction material, and, more specifically, to a bamboo based load bearing panel, and a manufacturing process thereof, with at least one basic bamboo panel element providing high load capacity, low material and manufacturing costs, and high durability, thereby substantially obviating one or more of the problems due to the limitations and disadvantages of the related art.

In some embodiments, a bamboo load bearing panel has the appearance and structure of plywood and includes at least one basic bamboo panel element comprising a bamboo laminate layer having first and second layers of a plurality of bamboo strips having a cortex and pith surface, parallel and longitudinally cut from bamboo culm pressed flat and planed wherein the first and second layers are each planed to a thickness, the cortex surface of the first layer of bamboo strip is bonded to the cortex surface of the second layer of bamboo strip and a wood veneer layer being bonded to the pith surface of the first layer of the bamboo strip positioned such that the grain of the wood veneer layer is perpendicular to the grain of the bamboo strip. A bamboo load bearing panel, according to one embodiment of the invention, comprises at least one basic bamboo panel element and optional layers of finishing wood veneers to the outside surfaces of the basic bamboo panel element. Utilizing a single basic bamboo panel element, a first wood veneer is applied to the wood veneer surface of the basic bamboo panel element positioned with the grain perpendicular to the grain of the wood veneer surface of the basic bamboo panel element, and a second wood veneer is bonded to the pith surface of the basic bamboo panel element positioned with the grain perpendicular to the grain of the pith surface, and a third wood veneer is bonded to the second wood veneer positioned with the grain perpendicular to the grain of the second wood veneer. Additional basic bamboo panel elements are optionally bonded together to achieve desired overall thickness and structural requirements with optionally finishing wood veneers applied.

The bamboo load bearing panel of one embodiment is manufactured by cutting timber grade bamboo culm into lengths of bamboo cane, cutting the bamboo cane longitudinally and perpendicularly to the radius of the cane into at least two bamboo strips having longitudinal edges, an outer cortex surface and an inner pith ring surface, pressing the bamboo strips flat such that the longitudinal edges are substantially parallel, planning the bamboo cortex flat and sufficiently to provide adhesive keying, planning the pith ring surface of the bamboo flat with respect to the planed cortex surface removing material sufficient to yield a desired thickness of the bamboo strip, forming a bamboo laminate layer comprising a first layer of bamboo strips positioned contiguously along the longitudinal edges with the pith ring surface facing one direction and a second layer of bamboo strips positioned contiguously along the longitudinal edges with the pith ring surface facing one direction, the cortex surface of the first and second bamboo strip layers being in contact and such that the bamboo strip edges do not align with the bamboo strip longitudinal edges of the adjacent bamboo strip layer with the first and second bamboo strip layers being laminated; and, laminating at least one wood veneer to at least one pith ring surface of the bamboo laminate layer.

In one embodiment of the invention, the basic bamboo panel element is a single bamboo laminate layer bonded to a single wood veneer layer. However, a plurality of basic bamboo panel elements are bonded together as required to obtain a desired overall dimensional thickness and structural strength of the finished bamboo load bearing panel. Wood veneer layers are optionally bonded to the basic bamboo panel element stack in combination wherein the wood veneers are selected to present a suitable wood finish to the finished bamboo load bearing panel appropriate for a particular construction application. It will be appreciated that a variety of bamboo load bearing panels may be formed by stacking and bonding the basic bamboo panel elements, and finishing with a final wood veneer layer such that both panel surfaces have wood surfaces presented.

It will further be appreciated that a single or plurality of bamboo laminate layers is suitable for bonding in any combination of wood veneers to yield desirable and advantageous structural characteristics. The bamboo load bearing panel according to the present invention preserves advantages of natural bamboo by maintaining much of the structural integrity of the bamboo culm while also satisfying the building material dimensional and conformity demands of the construction industry. Experiments have shown that the load bearing capacities of the bamboo load bearing panel exceed the equivalent wood products when the vertical grain of the bamboo laminate layer bears a vertical compression load. In particular, the bamboo load bearing panel far exceeds the load bearing capacity of wood plywood and OSB. Consequently, the bamboo bearing panel provides dimensions similar to wood plywood and OSB, but with superior load bearing capacity.

Other advantages of the bamboo load bearing panel include the fact that dimensional changes are minimal relative to soft wood and OSB products because bamboo is a hardwood. Noting that traditionally built wall structures typically utilize load bearing structural components, such as timber, for sustaining vertical loads and plywood or gypsum board for the vertical surfaces, the bamboo load bearing panel may be used as a substitute to replace both the timber load bearing components as well as the plywood or gypsum board elements thereby significantly reducing the cost of material and construction of traditionally built structures.

BRIEF DESCRIPTION OF THE DRAWINGS

The accompanying drawings, which are incorporated in and constitute a part of this specification illustrate embodiments of the invention and, together with the description, serve to explain the features, advantages, and principles of the invention.

In the drawings:

FIG. 1 illustrates a section of timber grade bamboo.

FIG. 2 is an end view of the section of timber grade bamboo of FIG. 1 with lines showing where the bamboo is cut lengthwise into three portions.

FIG. 3 is an end view of one of the lengthwise cut portions of the timber grade bamboo.

FIG. 4 is an end view of the lengthwise cut portion of timber grade bamboo after having been pressed.

FIG. 5 is a side view of the lengthwise cut portion of timber grade bamboo of FIG. 4 showing the inner and outer nodes of the bamboo.

FIG. 6 is the lengthwise cut portion of timber grade bamboo of FIG. 5 after being planed to remove the inner and outer nodes.

FIG. 11 is an end view of an assembled sheet of bamboo load bearing panel after being glued and pressed prior to trimming with lines showing where the assembled panel is to be trimmed.

FIG. 12 is and end view of the assembled panel of FIG. 7 having been trimmed.

FIG. 13 is an exploded view of an embodiment of bamboo load bearing panel according to the present invention.

FIG. 14 is a perspective view of an embodiment finished bamboo load bearing panel of the present invention.

DETAILED DESCRIPTION OF THE PREFERRED EMBODIMENT

Figure 7:
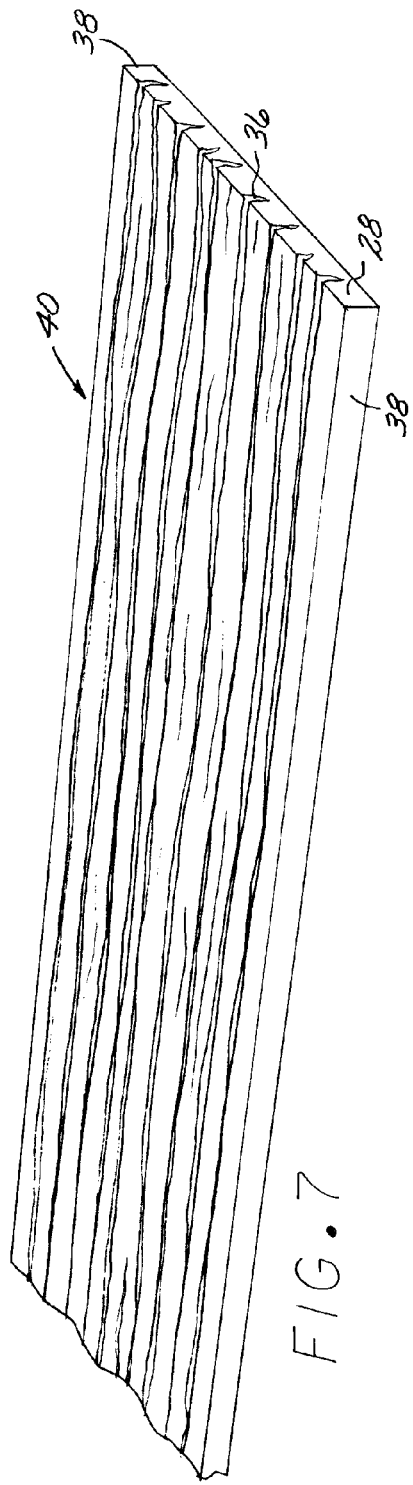
FIG. 7 is a perspective view of an end of a bamboo strip with the cortex surface facing downwardly having been flattened showing the longitudinal cracking of the lignin.

Although particular embodiments of the invention have been described in detail for purposes of illustration, various modifications may be made without departing from the spirit and scope of the invention. As used herein, the term "wood" refers to tree based material as distinguished from bamboo, which is grass based. Where examples are presented to illustrate aspects of the invention, these should not be taken as limiting the invention in any respect.

Referring to FIG. 1, in one embodiment of the invention the culm of timber grade bamboo is harvested into cane 20 of preferably lengths eight to twelve feet. The length of the cane is preferably determined so as to be sufficient to match or exceed the total vertical height, the load bearing dimension, of the finished bamboo load bearing panel so as to eliminate breaks in the vertical continuity of the panel. Natural bamboo possesses a taper of the culm wherein the bamboo cane 10 has a diameter at the lower end being larger than the diameter at the upper end.

In one embodiment, the bamboo load bearing panel is manufactured using timber grade bamboo, preferably 4 to 8 inches in diameter, is harvested by cutting the bamboo culm into lengths of bamboo cane 10, as shown in FIG. 1, being of longitudinal dimensions sufficient to span the vertical height of the finished panel. The bamboo should also be selected from species having fiber and vascular components that run longitudinally along the culm of sufficient density relative to the surrounding lignin so as to provide sufficient structural strength as found in time grade bamboo. As the bamboo culm is characterized by periodic inside and outside 22 nodes in the form of ringed protrusions from the inner and outer diameters of the culm wherein stems and leaves grow from the outside nodes 22, the stems and leaves must be removed from the cane. The internodal areas 24 have the most uniform distribution of fiber and vascular components. Of interest are species and ages of bamboo having culm wall 26 thicknesses, as measured in the internodal area 24, sufficient to yield a desired finished thickness of the bamboo layers in the finished panel. The cane is dried and prepared with methods well known in the lumber industry.

Referring next to FIG. 2, after drying and preparation, the bamboo cane 20 is divided longitudinally into sections preferably having typically a 3 to 4 inch outside diameter so as to produce bamboo strips preferably having a width of three to four inches when flattened. As bamboo culm tapers from the base to the tip, the bamboo culm is cut, instead of being split, so that the width of the bamboo strips remains substantially the same over the length of the strip. The cuts 28 are made along the length of the culm starting from the smaller diameter tip, with the cut being made through the central axis of the culm thus providing a substantially rectangular bamboo strip with parallel longitudinal edge surfaces 38. Note that the inner 30 and outer 22 nodes are mostly intact. The number of cut bamboo strips 40, as shown in FIG. 3, obtainable from a bamboo cane 20 is dependent upon the diameter of the bamboo culm. The harvesting and cutting technique yields bamboo strips of uniform length and width for a particular cane. As the strip width is not critical, the bamboo strip width is selected as a function of the culm diameter so as to maximize the utilization of the culm. Cutting bamboo strips from the tapered end maximizes the yield from a cane as when the cane is parallel cut into approximately equal widths, some scrap material is necessarily formed, and discarded, from the areas between the bamboo strips as the diameter of the culm increases along the length.

It will be appreciated that the bamboo strip 40 has the curvature of the bamboo cane as it is a portion thereof. The curved bamboo strip 40 is pressed flat, in FIG. 4, a process step that creates cracks 36 in the wall 26 that propagate from the softer inner pith surface 34 to the outer higher fiber content cortex surface 32. The cracks 36 tend to run longitudinally and randomly along the length of the bamboo strip 40. Because the inside radius of the bamboo strip 40 is necessarily smaller than the outside, the cracking creates voids of decreasing size from the inside pith surface 36. The pressing and flattening of the bamboo strip therefore results in a width expansion of the effective inner pith surface 34 area allowing the bamboo strip 40 to expand into an element with substantially parallel longitudinal edges 38.

As shown in FIG. 5, a side view of a flattened bamboo strip of FIG. 4, the bamboo strip has the inner pith surface and outer cortex surface intact including the inner and outer nodes. The present invention capitalizes on the anatomical features of the bamboo culm to provide the strength and low weight by preserving the advantageous structural characteristics of the bamboo culm in the invention. As such, the bamboo strip is further processed so as to minimize damage to these structural features. The bamboo culm contains fiber and tubular vascular components positioned axially along the length of the culm. The fiber and vascular components are intraspaced with a natural polymer lignin that acts, in part, as a binder. The density of fibers and vascular components increases towards the cortex of the bamboo culm. Conversely, the density of fiber and vascular components is lowest near the inner diameter, or pith surface, of the culm where the structure is dominated by lignin. Higher density fiber and vascular components provide higher strength. The cortex of the culm also comprises, amongst other elements and irregular features, a waxy material that interferes with the efficient binding of adhesives with the bamboo culm. Therefore, the outside surface of the bamboo strip is planed to remove the outer nodes, flatten and disrupt or remove the cortex only to the extent as to provide adequate surface area for keying adhesives required for binding the bamboo with adjacent laminate layers. The planing process also removes the protruding outer nodes. The planing process removes only enough material to flatten and disrupt the outside surface while conserving the majority of the high density vascular components present near the outside surface of the bamboo culm.

The inner pith surface 34 of the bamboo culm is planed to achieve the required finished thickness of the bamboo strip. Material is preferentially removed from the culm pith surface 34 to obtain the finished thickness as the inner surface is primarily lignin with a low density of fiber and vascular components thereby maximizing the fiber and vascular component density in the planed bamboo strip. FIG. 6 shows a side view of the planed bamboo strip with the inner 30 and outer 22 nodes removed.

Referring to FIG. 7, a perspective view of the planed bamboo strip with the outer cortex surface positioned downwardly, the longitudinal cracks, typified at 36, in the wall 26 are principally breaks in the lignin polymer leaving the longitudinally oriented fibers and vascular components of the wall 26 largely in tact.

Figure 8:
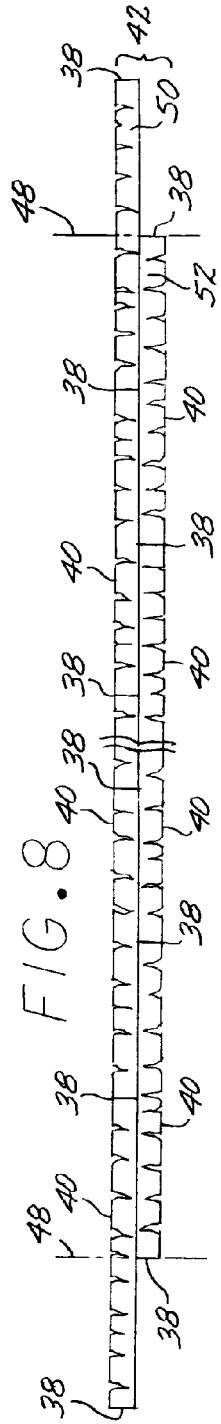
FIG. 8 is an end view of a bamboo laminate layer according to the present invention wherein the cortex surfaces of flattened bamboo strips are bonded together such that the longitudinal edges are staggered.

As in FIG. 8, a bamboo laminate layer 42 is comprised of two layers of bamboo strips constructed by forming the first layer 50 by positioning a plurality of flattened and planed bamboo strips 40 arranged as a panel aligned with the longitudinal edges 38 adjacent and abutting with the pith surfaces facing in the same direction. A sufficient number of bamboo strips are so arranged to provide a width to span the desired width of the finished bamboo load bearing panel. The second layer 52 is constructed with a plurality of flattened and planed bamboo strips 40 arranged with the cortex surface fixed to the cortex surface of the first layer 50, as a panel aligned with the longitudinal edges 38 adjacent and abutting with the pith surfaces facing in the same direction and additionally with the joints formed by the longitudinal edges 38 staggered with respect to the joints in the adjacent layer. The first 50 and second 52 layers are hot pressed together and bonded with traditional glues or resins and methods suitable for wood plywood manufacturing and the void bearing pith surfaces outwardly facing. The resulting bamboo laminate layer 42 is optionally trimmed to a desired width at laminate cuts 48. As the bamboo strips 40 have a propensity to curl back into their original curved culm shape, it is an important aspect of the present invention that the first and second layers are arranged with the corresponding cortex surfaces adjacent to each other. After bonding, the collective tensions of the curvatures of the bamboo strips are thereby canceled and provide stability to the bamboo laminate layer.

Figure 9:
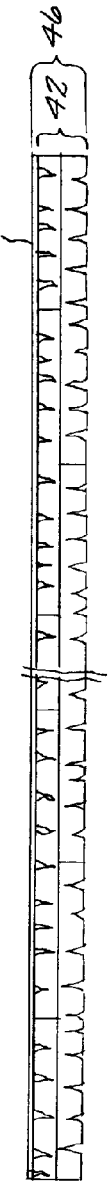
FIG. 9 is an end view of a basic bamboo panel element showing the wood veneer layer bonded to the bamboo laminate layer.

The basic bamboo panel element 46 construction is completed, as shown in FIG. 9, with the bonding of a softwood veneer 44 to one of the pith surfaces of a bamboo laminate layer 42. The softwood veneer is hot press bonded to either pith surface using traditional plywood glue or resin and is positioned such that the grain of the wood veneer 44 is perpendicular to the grain of the bamboo laminate layer 42. When the softer wood veneer is pressed into the void bearing pith surface a portion of the wood veneer is deformed by the pressure and molded into the vertical voids displacing a portion of the resin thereby providing additional surface contact area between the veneer and the lignin polymer of the bamboo culm. It will be apparent that this process increases the sheer strength of the bond between the veneer and the bamboo.

Figure 10:
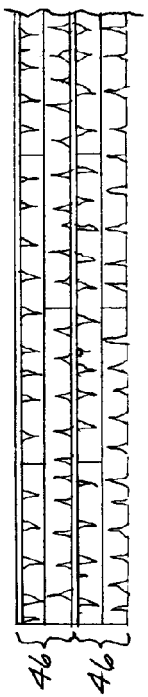
FIG. 10 is an end view of two basic bamboo panel elements bonded together with the bamboo laminate layer of a first basic bamboo panel element bonded to the wood veneer layer of a second basic bamboo panel element.

The bamboo panel element 46 is the basic element utilized in the formation of a variety of bamboo load bearing panels according to the present invention. The basic bamboo panel elements 46 may be stacked in any combination to produce a variety of thicknesses of finished load bearing panels. The wood veneer layers are typically 0.07 to 0.10 inches in thickness therefore being consistent with the traditional wood veneer layer thicknesses in conventional plywood. The bamboo laminate layer typically has a range of thickness of 0.1875 to 0.5 inches and is preferably about 0.375 inches thick. The thicknesses of the layers in combination are primarily limited by the capacity of the conventional plywood hot press used to manufacture the panel wherein the typical total thickness capacity is 1.375 inches. One embodiment is illustrated in FIG. 10 wherein two bamboo panel elements 46 are stacked and bonded with the exposed pith surface of one bamboo panel element adjacent to the wood veneer surface of the second bamboo panel element. It will be appreciated that any number of basic bamboo panel elements may be stacked and bonded with any orientation relative to each other. For example, the pith surfaces may be positioned against each other.

An exemplary finished bamboo load bearing panel prior to final trimming, shown in FIG. 11, is formed by bonding first 56, second 58, and third 60 finishing wood veneers to provide surfaces suitable for particular construction applications such as mimicking the surfaces of various grades of conventional wood plywood. After bonding, the final bamboo load bearing panel is trimmed at cuts 54 to the desired final finished bamboo load bearing panel dimensions yielding an exemplary finished bamboo load bearing panel 10 as shown in end view in FIG. 12.

Referring to FIG. 13, an exploded view of the exemplary finished bamboo load bearing panel 10 incorporating a single basic bamboo panel element, the finishing wood veneers are aligned such that the grain of each layer opposes perpendicularly the grain of an adjacent layer. The arrangement of the grain increases the overall strength of the finished bamboo load bearing panel. The opposing grain alignment can be observed when constructing any variant of finished bamboo load bearing panel utilizing any number of basic bamboo panel elements. First finishing wood veneer 56 is therefore bonded to the first softwood veneer 44 of the basic bamboo panel element, second finishing wood veneer 58 bonded to the pith surface of the basic bamboo panel element, and third wood veneer 60 bonded to the second finishing wood veneer 58, all with grains perpendicularly opposed. The exemplary finished bamboo load bearing panel 10 in completed form, as shown in perspective in FIG. 14, thusly provides a dimensionally stable and high strength superior replacement for load bearing structural components as well as a low cost substitute for conventional wood plywood products.

I claim:

1. A bamboo panel element, comprising:
a bamboo laminate layer with first and second layers formed of a plurality of bamboo strips, each having a cortex and a pith surface, longitudinally cut from bamboo culm and pressed flat,
wherein each of the bamboo strips within the first and second layers are arranged parallel to one another with the cortex surfaces facing the same direction within a layer and the bamboo strips within the first layer are oriented alike and opposite the bamboo strips within the second layer such that an internal interface between the first and second layers is formed by bonded together the corresponding cortex surfaces of the bamboo strips in the first and second layers and first and second outer surfaces of the bamboo laminate layer are defined by the pith surfaces of bamboo strips respectively in the first and second layers.

2. The bamboo panel element of claim 1, further comprising a wood veneer layer bonded to the pith surfaces of the bamboo strips in the first layer.

3. The bamboo panel element of claim 1, further comprising a wood veneer layer bonded to the pith surfaces of the bamboo strips in the first layer, wherein the wood veneer layer is positioned such that grain of the wood veneer layer is perpendicular to grain of the bamboo strips.

4. The bamboo panel element of claim 1, wherein each of the bamboo strips within the first and second layers is aligned abutting another one of the bamboo strips along a respective longitudinal edge defined by the cut.

5. The bamboo panel element of claim 1, wherein joints between the bamboo strips within the first layer are offset from joints between the bamboo strips within the second layer.

6. The bamboo panel element of claim 1, wherein each of the bamboo strips has a continuous length of at least 8 feet.

7. The bamboo panel element of claim 1, wherein each of the bamboo strips has a length that matches a dimensional extent of the bamboo laminate layer.

8. The bamboo panel element of claim 1, wherein the pith surfaces include longitudinal voids.

9. The bamboo panel element of claim 1 with the bamboo laminate layer made by the steps comprising:
cutting longitudinally bamboo culm to produce cut portions,
pressing flat the cut portions to produce the bamboo strips having a cortex and a pith surface,
arranging the bamboo strips in a first layer;
arranging the bamboo strips in a second layer, wherein the bamboo strips in the first and second layers are arranged parallel to one another;
bonding together the bamboo strips in the first and second layers, wherein the bamboo strips within the first layer are oriented alike with the cortex surfaces oriented alike and opposite the bamboo strips within the second layer also having the cortex surfaces oriented alike such that the bonding together bonds corresponding cortex surfaces of the bamboo strips in the first and second layers at an internal interface between the first and second layers, thereby providing first and second outer surfaces of the bamboo laminate layer defined by pith surfaces of bamboo strips respectively in the first and second layers.

10. The bamboo panel element of claim 9, made by the steps further comprising planing the bamboo strips along sides that formed an interior and an exterior of the bamboo culm.

11. The bamboo panel element of claim 9, made by the steps further comprising bonding a wood veneer layer to the pith surfaces of the bamboo strips in the first layer.

12. The bamboo panel element of claim 9, made by the steps further comprising pressing a wood veneer layer into voids of the pith surfaces of the bamboo strips in the first layer to deform and mold the wood veneer layer into the voids.

13. The bamboo panel element of claim 9, wherein the step of arranging the bamboo strips in the first and second layers includes positioning the bamboo strips with longitudinal edges formed by the cutting aligned without overlapping of the bamboo strips within one of the first and second layers.

14. The bamboo panel element of claim 9, wherein the step of arranging the bamboo strips in the first layer stagers joints between the bamboo strips within the first layer from joints between the bamboo strips within the second layer.

15. A bamboo panel element, comprising:
a bamboo laminate layer with first and second layers formed of a plurality of bamboo strips, wherein the bamboo strips have cortex and pith surfaces, are parallel and are longitudinally cut from bamboo culm, pressed flat and planed, wherein the cortex surfaces of the bamboo strips in the first layer, having the cortex surfaces oriented alike, are bonded to the cortex surfaces of the bamboo strips in the second layer; and a wood veneer layer bonded to the pith surfaces of the bamboo strips in the first layer, wherein the wood veneer layer is positioned such that grain of the wood veneer layer is perpendicular to grain of the bamboo strips.

16. The bamboo panel element of claim 15, further comprising a finishing wood veneer bonded to one of the bamboo laminate layer and the wood veneer layer to form an outside surface of the bamboo panel element.

17. The bamboo panel element of claim 15, wherein the first layer has a thickness defined by a single one of the bamboo strips between the wood veneer layer and the second layer.

18. The bamboo panel element of claim 15, further comprising a finishing wood veneer bonded to the pith surfaces of the bamboo strips in the second layer.

19. The bamboo panel element of claim 15, further comprising a finishing wood veneer bonded to the pith surfaces of the bamboo strips in the second layer, wherein a thickness of the bamboo laminate layer between the wood veneer layer and the finishing wood veneer is defined by two of the bamboo strips.

20. The bamboo panel element of claim 19, wherein the thickness of the bamboo laminate layer is between 0.1875 and 0.5 inches.

* * * * *